United States Patent
Sheikh Faridul et al.

(10) Patent No.: US 10,116,919 B2
(45) Date of Patent: Oct. 30, 2018

(54) METHOD AND ARRANGEMENT FOR ESTIMATING AT LEAST ONE CROSS-CHANNEL COLOUR MAPPING MODEL FROM AN SET OF TUPLES OF CORRESPONDING COLOURS RELATIVE TO AT LEAST TWO IMAGES

(71) Applicant: THOMSON LICENSING, Issy de Moulineaux (FR)

(72) Inventors: Hasan Sheikh Faridul, Cesson-Sevigne (FR); Jurgen Stauder, Montreuil/Ille (FR); Emmanuel Jolly, Rennes (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 569 days.

(21) Appl. No.: 14/442,748

(22) PCT Filed: Nov. 5, 2013

(86) PCT No.: PCT/EP2013/072978
§ 371 (c)(1),
(2) Date: May 14, 2015

(87) PCT Pub. No.: WO2014/075943
PCT Pub. Date: May 22, 2014

(65) Prior Publication Data
US 2015/0304627 A1 Oct. 22, 2015

(30) Foreign Application Priority Data
Nov. 14, 2012 (EP) .................................. 12306405

(51) Int. Cl.
*G06K 9/00* (2006.01)
*H04N 13/15* (2018.01)
(Continued)

(52) U.S. Cl.
CPC ........... *H04N 13/15* (2018.05); *H04N 1/6058* (2013.01); *H04N 1/6061* (2013.01); *H04N 1/6063* (2013.01); *G01J 2003/466* (2013.01)

(58) Field of Classification Search
CPC ............. H04N 13/0037; H04N 1/6063; H04N 1/6061; H04N 1/6058; G01J 2003/466
See application file for complete search history.

(56) References Cited

U.S. PATENT DOCUMENTS 3,572,900 A * 3/1971 Bouch' ............... G02B 27/4238
348/762
7,062,415 B2  6/2006 Whitefield et al.
(Continued)

FOREIGN PATENT DOCUMENTS

EP    1701555    9/2006
EP    1952344    5/2007
(Continued)

OTHER PUBLICATIONS

Hasan et al., "Optimization of Sparse Color Correspondences for Color Mapping", Society for Imaging Science and Technology Color Imaging Conference (CIC), Los Angeles, California, USA, Nov. 12, 2012, pp. 1-7.

(Continued)

*Primary Examiner* — Aaron W Carter
(74) *Attorney, Agent, or Firm* — Tutunjian & Bitetto, P.C.

(57) ABSTRACT

The present invention generally relates to a method and arrangement for estimating said at least one cross-channel color mapping model from a set of tuples of corresponding colors relative to at least two images. The method is characterized in that it uses a processor for selecting at least one intermediate tuple of corresponding colors from the set of tuples of corresponding colors by using at least one channel-wise color mapping model, and for estimating the at least (Continued)

Figure 1:
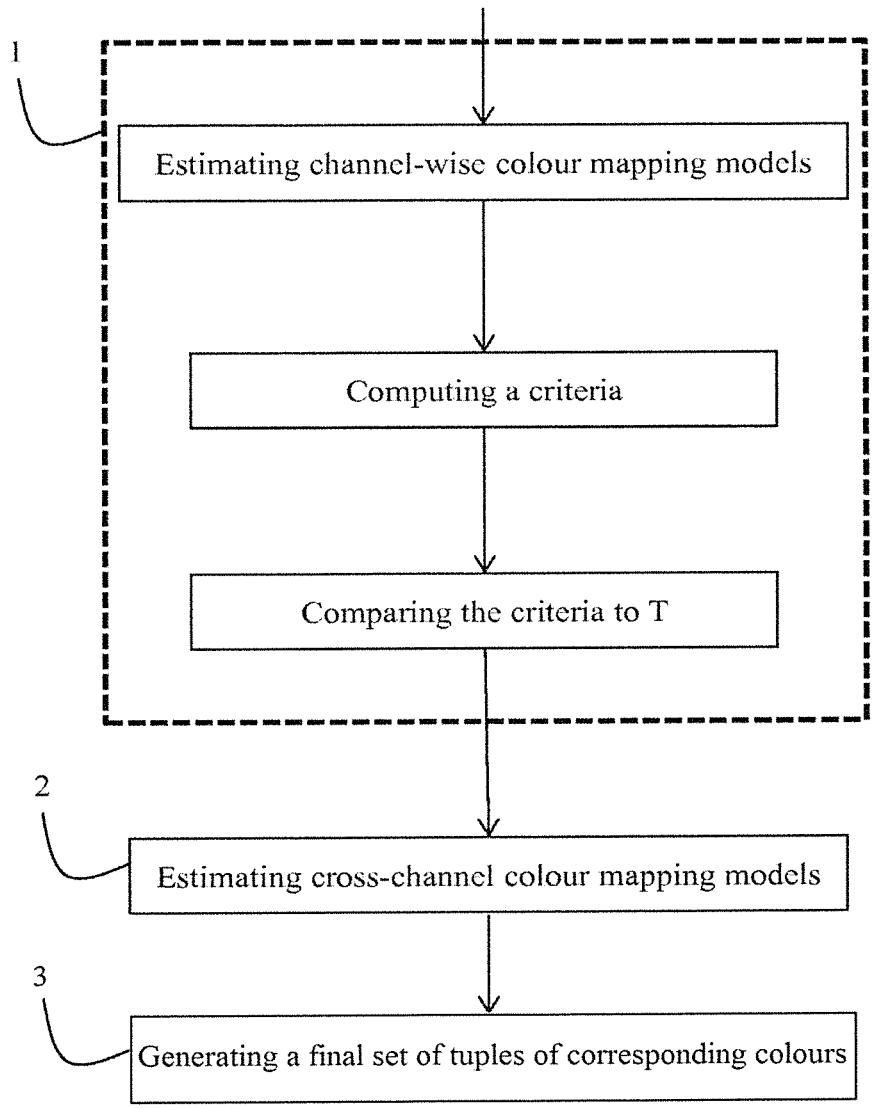

one cross-channel color mapping model from the at least one intermediate selected tuple of corresponding colors.

8 Claims, 2 Drawing Sheets

(51) Int. Cl.
*H04N 1/60* (2006.01)
*G01J 3/46* (2006.01)

(56) References Cited

U.S. PATENT DOCUMENTS

| | | | |
|---|---|---|---|
| 7,450,267 B2 | 11/2008 | Ito et al. | |
| 7,756,325 B2 | 7/2010 | Vetter et al. | |
| 2005/0068463 A1* | 3/2005 | Feng | G09G 3/2055 348/574 |
| 2005/0185001 A1* | 8/2005 | Feng | G09G 5/026 345/597 |
| 2009/0073262 A1* | 3/2009 | Fielding | H04N 9/11 348/97 |
| 2009/0148051 A1* | 6/2009 | Pham | G06K 9/32 382/219 |
| 2012/0320063 A1* | 12/2012 | Finch | G06T 11/203 345/442 |
| 2013/0002810 A1* | 1/2013 | Stauder | H04N 13/0037 348/42 |
| 2013/0092738 A1* | 4/2013 | Blasinski | G06K 19/0614 235/462.04 |
| 2015/0304627 A1* | 10/2015 | Sheikh Faridul | H04N 13/0037 348/42 |
| 2016/0225342 A1* | 8/2016 | Smolic | G09G 5/06 |

FOREIGN PATENT DOCUMENTS

| | | |
|---|---|---|
| GB | 2384642 | 7/2003 |
| WO | WO2007059602 | 5/2007 |

OTHER PUBLICATIONS

Motulsky et al., "Detecting outliers when fitting data with nonlinear regression—a new method based on robust nonlinear regression and the false discovery rate", BMC Bioinformatics, vol. 7:123, Mar. 9, 2006, pp. 1-20.

Bookstein, F., "Principal Warps: Thin-Plate Splines and the Decomposition of Deformations", IEEE Transactions on Pattern Analysis and Machine Intelligence, vol. 11, No. 6, Jun. 1989, pp. 567-585.

Hasan et Al;"Robust color Correction for stereo"; Visual Media Production (CVMP)2011, Conference for IEEE Nov. 16, 2011 (Nov. 16, 2011); pp. 101-108.

Lowe: "Distinctive image features from scale-invariant keypoints"; International journal of computer vision; Jan. 4, 2004; pp. 1-28.

Matas et Al: "Robust widebaseline stereo from maximally stable extremal regions"; Image and Vision Computing; 2002; pp. 384-393.

Search Report dated March 12, 2014, PCT/EP2013/072978.

* cited by examiner

METHOD AND ARRANGEMENT FOR ESTIMATING AT LEAST ONE CROSS-CHANNEL COLOUR MAPPING MODEL FROM AN SET OF TUPLES OF CORRESPONDING COLOURS RELATIVE TO AT LEAST TWO IMAGES

This application claims the benefit, under 35 U.S.C. § 365 of International Application PCT/EP2013/072978, filed Nov. 5, 2013, which was published in accordance with PCT Article 21(2) on May 22, 2014 in English and which claims the benefit of European patent application No. 12306405.7, filed Nov. 14, 2012.

1. FIELD OF INVENTION

The invention relates to a method and arrangement for estimating at least one cross-channel colour mapping model from an initial set of tuples of corresponding colours relative to at least two images. The invention relates also to a method and arrangement which uses such at least one estimated cross-channel colour mapping model to generate a final set of tuples of corresponding colours corresponding from a set of tuples of corresponding colors. For example, those methods and arrangements are used for colour mapping of multiple views based applications such as stereoscopic or 3-D imaging.

2. TECHNICAL BACKGROUND

Applications involving multiple views from multiple directions of the same scene, such as stereo imaging in the meaning of stereoscopic or 3-D imaging, or applications involving multiple views of a scene (static or non-static) at different time instants while scene elements are changing, such as feature film production, video capturing or broadcasting, or applications involving multiple versions of originally the same image, such as two different scans of the same film negative, suffer from geometric differences and colour differences between different images. Stereoscopic imaging or real 3D requires a minimum of two pictures simulating our two eyes, the left image and the right image. Geometric differences can be caused by parallax in case of stereo images and by cropping, zoom, rotation or other geometric transforms in case of film scans. In case of capturing views at different time instants, geometric differences can be caused by object or camera motion. Colour differences are caused for example by shading, change of illumination direction, colour or distribution, specular reflections, cast shadows and other photometric effects. Colour differences are also being caused for example by non-calibrated cameras, non-calibrated film scanners, automatic exposure settings, automatic white balancing or even physical light effects in the scene.

Colour difference compensation is often the first step in image or video signal processing of multiple views or stereoscopic pictures as other steps such as disparity estimation or data compression benefited from low colour difference. In case of feature film, video and broadcasting, colour differences can disturb artistically the produced content, notably when editing involves the temporal reordering of images.

One approach for the compensation of colour differences between images is colour mapping, also called color transfer or colour correction which is applied for colour transformation. Colour mapping has the task of remapping the colour channels of an image to be suitable for further colour signal processing, colour signal transmission or colour reproduction.

Colour mapping starts typically with finding Geometric Feature Correspondences, usually abbreviated GFC, using methods such as Scale Invariant Feature Transformation, usually abbreviated SIFT or simply using a normalized cross correlation.

GFC is a list of pairs of matched feature points in multiple image (or views). Each of these pair is usually called a sample. GFC allow coping with the geometric differences between at least two images. As GFC computation is not free from errors, some samples of the GFC are wrong and are so-called outliers. These outliers are either coming from spatial positioning error of feature points or an error (so called "false positives") in the matching of feature points. Wrong samples of GFC, outliers, are not positioned on the same semantic image detail in the images such as in the left and the right images in the case of stereo imaging, or in any two or more images in case of scanning, motion picture, video and broadcasting.

In a next step, those outliers are usually removed. Such a outlier removal step is significant because for example, if a sample of GFC lies in a highly textured region, a small error in spatial position of this sample of GFC can generate a large error in corresponding colors so that improved outlier detection is desired.

Finally, the remaining samples of GFC, also called "cleaned" GFC, are used to build a set of tuples of corresponding colour in order to fit a colour mapping model or to build a colour look up table.

It is usual to remove outliers in GFC directly after their calculation. Such a method rejects a sample of GFC as outlier if it does not match a geometric transformation model that is estimated from all samples of GFC. But, the drawback is that the geometric transformation model may not be able to describe all geometric differences between images, notably at high depth dynamics.

It is also usual that to reject a sample of a "cleaned" GFC in the framework of robust estimation of an initial color mapping model. But, the drawback is to reject some samples of the "cleaned" GFC as outliers if an initial estimated colour mapping model is far from these samples of the "cleaned" GFC. Such method then misses a wide range of true outliers as well as mistakenly detects some truly valid samples of the "cleaned" GFC as outliers. Another usual error of this method is inconsistency between colour channels such as e.g. applying a colour mapping model per channel without cross checking of outlier decisions between colour channels.

It is an aspect of the invention to reduce the number of false negatives which means to reduce the number of cases where a sample of GFC is detected as valid but truly is an outlier. Reducing false negatives is important as the color mapping model can be influenced by those missed outliers.

It is a further aspect of the invention to reduce the number of false positives in outlier detection, which means to reduce the number of cases where a sample of GFC is detected as an outlier but truly is not an outlier to provide more valid information for an improved colour mapping model.

3. SUMMARY OF THE INVENTION

The present invention aims at alleviating some of the inconveniences of prior art.

For that, it relates to a method for estimating at least one cross-channel colour mapping model from a set of tuples of corresponding colours relative to at least two images. The method is characterised in that it comprises steps for:

selecting at least one intermediate tuple of corresponding colours from the set of tuples of corresponding colours by using at least one channel-wise colour mapping model, and estimating said at least one cross-channel colour mapping model from said at least one intermediate selected tuple of corresponding colours.

The method is a two-step approach to estimate at least one cross-channel color mapping model. First, some tuples of corresponding colors are selected from simple channel-wise colour mapping model from an initial set of tuples of corresponding colours and second, a precise color mapping model taking into account the channel interrelations is estimated on said selected tuples of corresponding colours. That means that in difference to classical estimation methods in so far that the decision to use or not a tuple of corresponding colours is not based only on the matching of geometric features, and is not only based on a single color mapping model, but on channel-wise colour mapping models and cross-channel colour mapping models.

This method provides advantages such as effective exclusion of erroneous tuples of corresponding colours thanks to the channel-wise colour mapping models which are easy to estimate compared to more complex colour mapping models. This method also preserves the rich information of corresponding colours by using cross-channel colour mapping models with respect to methods using simple, channel-wise colour mapping models that do not describe the color change with sufficient precision.

According to an embodiment, the step for selecting said at least one intermediate tuple of corresponding colours comprises:

selecting said at least one intermediate tuple of corresponding colours by estimating from the set of tuples of corresponding colours a channel-wise colour mapping model for each channel of a m-dimensional colour space, and comparing a criterion obtained from said at least one estimated channel-wise colour mapping model to a determined threshold.

According to an embodiment, at least one of the channel-wise colour mapping model is a colour transform.

According to an embodiment, said at least one channel-wise colour mapping model is based on gain, offset and/or gamma parameters.

According to an embodiment, said at least one cross-channel colour mapping model is based on thin plate splines.

According to an embodiment, said at least one cross-channel colour mapping model has a parameter that controls the smoothness in the colour space According to an embodiment, said smoothness parameter is fixed to a determined value.

The invention also relates to a method for generating a final set of tuples of corresponding colours corresponding from a set of tuples of corresponding colors. The method is characterized in that at least one cross-channel colour mapping channel model is estimated from said set of tuples of corresponding colors according to an above-explained method, said final set of tuples of corresponding colours having colours with a difference to said at least one cross-channel colour mapping model that is smaller than a determined threshold.

According to one of its material aspects, the invention concerns an arrangement for estimating at least one cross-channel colour mapping model from a set of tuples of corresponding colours relative to at least two images. The arrangement is characterised in that it comprises processing means configured for:

selecting at least one intermediate tuple of corresponding colours from the set of tuples of corresponding colours by using at least one channel-wise colour mapping model, and estimating said at least one cross-channel colour mapping model from said at least one intermediate selected tuple of corresponding colours.

According to another of its material aspects, the invention concerns an arrangement for generating a final set of tuples of corresponding colours corresponding from a set of tuples of corresponding colors. The arrangement is characterized in that it comprises processing means configured for estimating at least one cross-channel colour mapping channel model from said set of tuples of corresponding colors according to an above-explained method, said final set of tuples of corresponding colours having colours with a difference to said at least one cross-channel colour mapping model that is smaller than a determined threshold.

The specific nature of the invention as well as other objects, advantages, features and uses of the invention will become evident from the following description of a preferred embodiment taken in conjunction with the accompanying drawings.

4. LIST OF FIGURES

Figure 2:
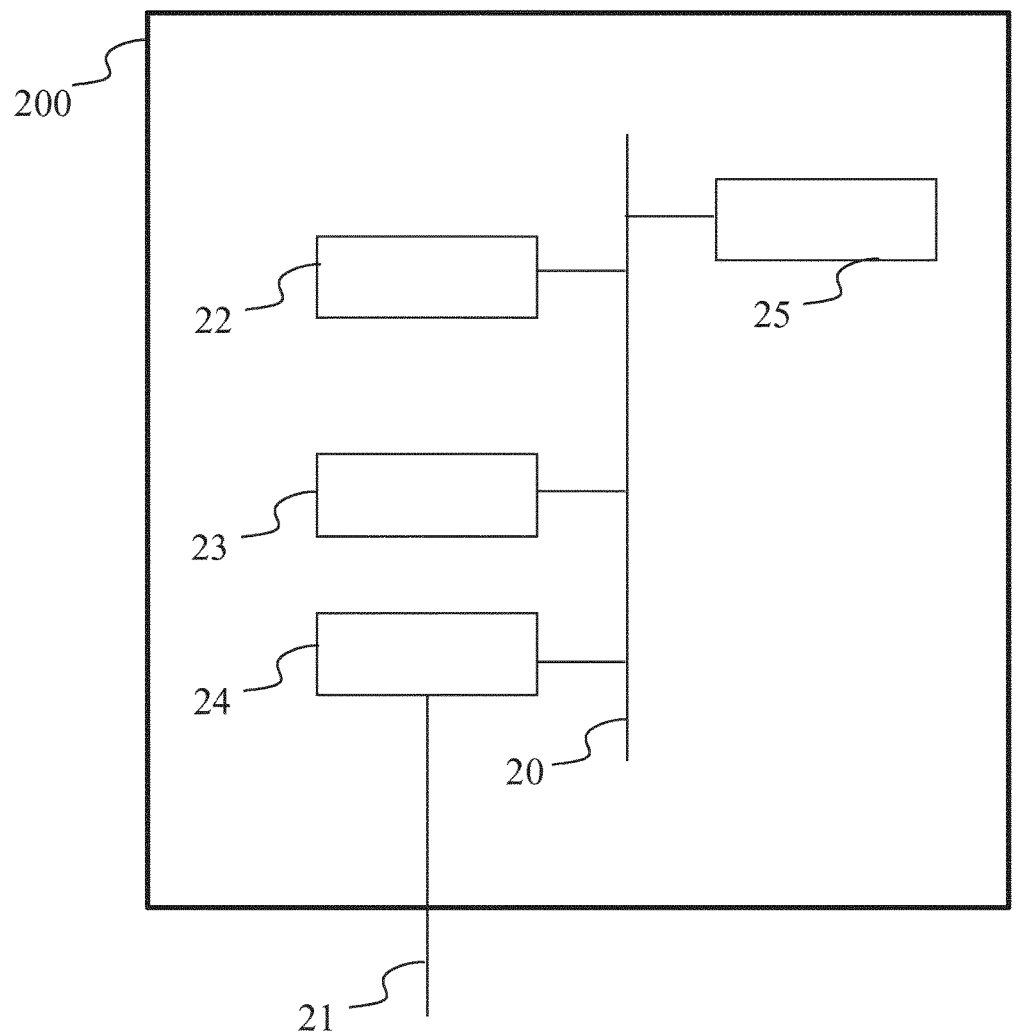

The embodiments will be described with reference to the following figures:

FIG. 1 shows a diagram of the main steps of the method according to the present invention, FIG. 2 shows an arrangement comprising processing means configured to implement the step of the method according to an embodiment of the invention.

5. DETAILED DESCRIPTION OF THE INVENTION

Generally speaking, the invention concerns a method for estimating a colour mapping model from a set of tuples of corresponding colours relative to at least two images.

Multiple approaches may be used to define such a set of tuples of corresponding colours from images (or views). The invention does not request any specific approach. In the literature, several type of detectors exist that are to extract tuples of image features. For example, the well-known MSER (J. Matas, O. Chum, M. Urban, and T. Pajdla. Robust wide-baseline stereo from maximally stable extremal regions. *Image and Vision Computing*, 22(10):761-767, 2004.) and DOG (D. Lowe. Distinctive image features from scale-invariant keypoints. *International journal of computer vision*, 60(2):91-110, 2004) detectors may be used.

Resulting from the detector are multiple patches which belongs to a same image and/or to multiple images. Generally speaking, these patches belong to n different images (usually n=2). Each patch may be described, for example by a SIFT descriptor (D. Lowe. Distinctive image features from scale-invariant keypoints. *International journal of computer vision*, 60(2):91-110, 2004.). Any other descriptor may be used without limiting the scope of the invention.

A feature matching provides a match between patches of those n images and a tuple of corresponding colours is built for each set of matched patches. For example the well-known method of Hasan Sheik-Faridul entitled "Optimization of Sparse Color Correspondences for Color Mapping"

published in the Colour and Imaging Conference 2012 proposes to select a tuple of corresponding colours in a spatial neighborhood of the matched patches. A tuple of corresponding colours thus comprises n elements, each one being a colour of a patch of an image.

Colour spaces in images include RGB, YCbCr and XYZ colour spaces. Other colour spaces do exist, also with more or less three coordinates (m>3 or m<3). For example, the RGB colour space can be defined by the standard ITU-R BT.709, the YCbCr colour space according to the standard SMPTE S274M or the XYZ by the CIE in 1931.

A tuple of corresponding colours is then a tuple with n colours defined in a m-dimensional colour space and the set of tuples of corresponding colours is then formed by bringing together these tuples of corresponding colours.

According to the invention, the method comprises steps for selecting at least one intermediate tuple of corresponding colours from the set of tuples of corresponding colours by using at least one channel-wise colour mapping model, and for estimating at least one cross-channel colour mapping model from said at least one intermediate selected tuple of corresponding colours.

According to an embodiment, shown in FIG. 1, the step for selecting said at least one intermediate tuple of corresponding colours (step 1 on FIG. 1) comprises estimating from the set of tuples of corresponding colours a channel-wise colour mapping model for each channel of a m-dimensional colour space and comparing a criterion obtained from said at least one estimated channel-wise colour mapping model to a determined threshold.

A channel-wise colour mapping model is a 1-dimensional colour mapping model which is an estimate of a single colour channel without taking into account cross channel influence.

The number of channel-wise colour mapping models equals the dimension of the colour space.

For example, three channel-wise colour mapping models are required for a RGB colour space (m=3), one for the red channel, one for the green channel and one for the blue channel.

The definition of each channel-wise colour mapping model depends on the number of input images. For example, when a two input images $I_1$ and $I_2$ in a RGB color space are considered (n=2, m=3), three channel-wise colour mapping models $f_R, f_G, f_B$ are required that provides estimates $\widehat{R_{I1}}, \widehat{G_{I1}}, \widehat{B_{I1}}$ of the colour channels $R_{I1}, G_{I1}, B_{I1}$ of the image $I_1$ from the colour channels $R_{I2}, G_{I2}, B_{I2}$ of the image $I_2$ respectively according to:

$$\widehat{R_{I1}} = f_R(R_{I2})$$

$$\widehat{G_{I1}} = f_G(G_{I2})$$

$$\widehat{B_{I1}} = f_B(B_{I2})$$

According to an embodiment, the channel-wise colour mapping model is a colour transform, preferably a Gamma-Offset-Gain (GOG) model given by:

$$\widehat{C_{I1}} = G^C\{C_{I2}\}^{\gamma^C} + b^C$$

where $C_{I1}$ is a color channel of an input image $I_1$ ($C_{I1} \in \{R_{I1}, G_{I1}, B_{I1}\}$) and $C_{I2}$ is a color channel of another input image $I_2$ ($C_{I2} \in \{R_{I2}, G_{I2}, B_{I2}\}$), and parameters $G^C$ defines a gain for a color channel C ($C \in \{R, G, B\}$), $\gamma^C$ a gamma correction for the color channel C and $b^C$ an offset for the color channel C. The GOG model was designed originally only for cases such as color change due to an uncalibrated camera. In this invention, the GOG-based model helps "cleaning" the corresponding colours by a robust fitting and makes it ready for further modeling. Success of the GOG modeling is decisive, if later data driven models are used that can be heavily influenced by outliers.

Variants of this embodiment consists in considering only some of these three parameters in the model.

The use of a GOG model is advantageous because this is a simple, powerful and stable color mapping model which removes noisy tuple of corresponding colors from the set of tuples of corresponding colouers when their parameters are optimized.

According to an embodiment, the parameters $\beta^C = \{G^C, \gamma^C, b^C\}$ of a GOG model are estimated by solving a linear regression problem.

According to an embodiment, the parameters of the GOG model are iteratively estimated by minimizing a $L_p$ norm.

According to an embodiment, the parameters of a GOG model are iteratively estimated by minimizing a reweighted least-squares criteria.

According to this embodiment, at step t+1, the parameters $\beta_{t+1}^C$ are then given from the parameters $\beta_t^C$ estimated at the previous step t by:

$$\beta_{t+1}^C = \underset{\beta^C}{\arg\min} \sum_{i=1}^{n} w_i^t |C_{I1} - \widehat{C_{I1}}|^2$$

where $w_i^t$ is a Huber function given preferably by $$w_i^t = \frac{1}{\max(1, |r^t|)}$$

with $r^t = C_{I1} - \widehat{C_{I1}}$ is the residual error at step t between the colour component of a channel of an image and a version of this channel estimated by the corresponding channel-wise colour model.

Once a channel-wise colour mapping model is estimated for each channel of the colour space, at least one tuple of corresponding colours, said intermediate, is selected from the set of tuples of corresponding colours by comparing a criterion obtained from at least one estimated channel-wise colour mapping model to a predefined threshold T.

According to an embodiment, the criterion is the residual error $r^t$.

According to another embodiment, the criteria is a distance measure in the colour space of the residual errors calculed for each channel of this colour space.

For example for a RGB color space between two images $I_1$ and $I_2$, the criterion is an Euclidean distance given by:

$$\sum_{C \in \{R,G,B\}} |C_{I1} - \widehat{C_{I1}}|^2$$

According to another embodiment, the criteria is a multiple of the robust standard deviation of residuals (RSDR) as defined by Motulsky and Brown (H. Motulsky and R. Brown. Detecting outliers when fitting data with nonlinear regression—a new method based on robust nonlinear regression and the false discovery rate. *BMC bioinformatics*, 7(1):123, 2006). The RSDR is a method to quantify points scattered around a curve generated by robust nonlinear regression. Motulsky quantifies the scatter by calculating the 68.27 percentile of the absolute values of the residuals because 68.27% of values in a Gaussian distribution lie within one standard deviation of the mean.

The selection of at least one intermediate tuple of corresponding colours may be e.g. varied by making the threshold for remaining colour differences adapted to the colour signal, for example setting it to a multiple of the colour difference before colour mapping or after colour mapping, or using colour ratios instead of colour differences without to depart from the scope of the present invention.

According to the invention, the method comprises steps for estimating at least one cross-channel colour mapping model from said at least one intermediate selected tuple of corresponding colours (step 2 on FIG. 2).

A cross-channel colour model is a colour mapping model which is an estimate of the color coordinate of a single colour channel but taking into account cross channel influence. A cross-channel colour model is then relative to a colour channel of a colour space and is a function of at least one other colour channel of this colour space.

The number of cross-channel colour mapping models equals the dimension of the colour space.

For example, three cross-channel colour mapping models are required for a RGB colour space (m=3), one for the red channel, one for the green channel and one for the blue channel.

The definition of each cross-channel colour mapping model depends on the number of input images but also of the number of adjacent channels which are taken into account.

Preferably, when the RGB colour space is used, a function $f_{tps}^R$ for the estimate of the red channel and a function $f_{tps}^G$ for the estimate of the green channel of an image $I_1$ use the red and green channels of an image $I_2$ and a function $f_{tps}^B$ for the estimates of the blue channel of the image $I_1$ is estimated from the red and blue channels of the image $I_2$. Instead of taking all three channels (red, green and blue), only two are taken at a time.

These assumptions are motivated from red, green and blue channel sampling in a typical camera. Moreover, the resulting model will be smooth with respect to the third—missing—color channel and therefore can be generalized more easily for all colors of the color space. Finally, not using always all color channels reduces the computational load and increases the robustness of model estimation.

Based on these assumptions, the three cross-channel models are given by:

$\widehat{R_{I1}} = f_{tps}^R(R_{I2}, G_{I2})$ $\widehat{G_{I1}} = f_{tps}^G(R_{I2}, G_{I2})$ $\widehat{B_{I1}} = f_{tps}^B(T_{I2}, B_{I2})$ These assumptions do not limit the scope of the invention because the function of each (or at least one) cross-channel colour mapping model may also takes into account the influence of more than two other colour channels.

According to an embodiment, a cross-channel colour mapping model relative to a colour channel C (C ∈ {R, G, B} in case of RGB color space) is based on thin-plate splines. More precisely, the function $f_{tps}^C$ of a cross-channel colour mapping model relative to a colour channel C (C ∈ {R, G, B} in case of RGB color space) uses thin-plate splines that estimates the channel $C_{I1}$ of an image $I_1$ from at least one channel of an image $I_2$.

A complete definition of thin-plate spline may be found in Bookstein (F. Bookstein. Principal warps: Thin-plate splines and the decomposition of deformations. *Pattern Analysis and Machine Intelligence, IEEE Transactions on,* 11(6):567-585, 1989).

In brief, a thin-plate spline fits smoothly clattered data using pieces of—for example—cubic spline functions. Since the set of intermediate tuples of corresponding colours is "cleaned" from the worse outliers, such a model allows to precisely model cross-channel changes.

According to an embodiment, for the case of a 3-dimensional colour space having the color channels C, K and L, the thin-plate spline $f_{tps}^C$ for the color channel having the colour coordinate C is regularized using a data driven model which is an unique minimizer of a weighted sum given by:

$f_{tps}^C = \operatorname{argmin}[\lambda E(f_{tps}^C) + (1-\lambda)RO(f_{tps}^C)]$ with $E(f_{tps}^C)$ an error measure given by $$E(f_{tps}^C) = \sum_{C \in \{R,G,B\}} |C_{I1} - f_{tps}^C(C_{I1}, K_{I1})|^2$$

and $RO(\eta_{tps}^C)$ a roughness measure is a sum of first and second derivatives of the thin-plate spline function. In this case, the cross-channel influence of coordinates C and K are considered for modeling C while the influence of L is not considered.

For example, to estimate the red channel R of the Image $I_1$ from the red and green channels of $I_2$, the roughness measure is given by $$RO(f_{tps}^R) = \int\int\left[\left(\frac{\partial^2 f_R}{\partial R^2}\right)^2 + \left(\frac{\partial^2 f_R}{\partial R \partial G}\right)^2 + \left(\frac{\partial^2 f_R}{\partial G^2}\right)^2\right]dRdG$$

where λ is a smoothing parameter that controls the smoothness in the colour space. If λ is near to 1 it's a least square approximation and the model will try to go through all input color data and therefore might overfit. On the other hand, if λ is near to zero, it is a linear polynomial approximation.

According to an embodiment, a cross-channel colour mapping model has a smoothness parameter fixed with a predefined value. In the previous embodiment such a parameter is the parameter λ.

Such a parameter is common in estimation and model fitting when the colour mapping model has a high degree of freedom. The smoothness parameter is then used to avoid over-fitting of the model to the colour correspondences.

For some applications, it is useful to have a final set of tuples of corresponding colours that are well in coherence with an estimated cross-channel colour model. In block 3 of FIG. 1, this final set of tuples of corresponding colours can be either calculated from the estimated cross-channel model or by other methods allowing to generate such a final set using the cross-channel colour model. Such a final set is useful to create a look-up-table, or representation of image colours or for other applications.

According to a particular application of the invention, the invention relates also to a method for generating a final set of tuples of corresponding colours corresponding from a set of tuples of corresponding colors. The method is characterized in that at least one cross-channel colour mapping channel model is estimated from the set (initial) of tuples of corresponding colors using a method as above-explained in relation with FIG. 1 and the final set of tuples of corresponding colours has colours with a difference to said at least one cross-channel colour mapping model that is smaller than a determined threshold.

FIG. 2 shows an arrangement 200 that can be used to implement the method of the invention. The arrangement comprises the following components, interconnected by a digital data and address bus 20:
- a processing unit 23 (or CPU for Central Processing Unit);
- a memory 25;
- a network interface 24, for interconnection of arrangement 200 to other arrangement or devices connected in a network via connection 21.

Processing unit 23 can be implemented as a microprocessor, a custom chip, a dedicated (micro-) controller, and so on. Memory 25 can be implemented in any form of volatile and/or non-volatile memory, such as a RAM (Random Access Memory), hard disk drive, non-volatile random-access memory, EPROM (Erasable Programmable ROM), and so on. Arrangement 200 is suited for implementing a data processing device according to the method of the invention.

A set of tuples of corresponding colours and/or a channel-wise colour mapping model may be obtained from the network interface 24 via the connection 21 or from the memory 25 or resulting of a cooperation between the processing unit 23 and the memory 25.

The processing unit 23 and the memory 25 are configured to cooperate with each other to select at least one intermediate tuple of corresponding colours from the set of tuples of corresponding colours by using at least one channel-wise colour mapping model, and to estimate at least one cross-channel colour mapping model from said at least one intermediate selected tuple of corresponding colours. Such a selection and estimation conform to the method described in relation with the FIG. 1.

According to an embodiment, the processing unit 23 and the memory 25 are configured to cooperate with each other to generating a final set of tuples of corresponding colours corresponding from a set of tuples of corresponding colors. For that, the processing unit 23 and the memory 25 are configured to estimate a cross-channel colour mapping channel model from said set of tuples of corresponding colors according to a method described in relation with the FIG. 1, said final set of tuples of corresponding colours having colours with a difference to said at least one cross-channel colour mapping model that is smaller than a predefined threshold.

According to a particular embodiment, the invention is entirely implemented in hardware, for example as a dedicated component (for example as an ASIC, FPGA or VLSI) (respectively «Application Specific Integrated Circuit», «Field-Programmable Gate Array» and «Very Large Scale Integration») or according to another variant embodiment, as distinct electronic components integrated in a device or, according to yet another embodiment, in a form of a mix of hardware and software.

The invention claimed is:

1. A method for compensation of colour differences between at least two images imaging a same scene, the colours of which are represented according to m colour channels, comprising:
- extracting from said images a set of tuples of corresponding colours;
- estimating from said set of tuples of corresponding colours a channel-wise colour mapping model for each of said m colour channels;
- selecting within said set of tuples of corresponding colours at least one intermediate tuple having colours with a difference to said estimated channel-wise colour mapping model that are smaller than a determined threshold;
- estimating from said at least one selected intermediate tuple of corresponding colours at least one cross-channel coulour mapping model for at least one of said m colour channels;
- generating a final set of final tuples of corresponding colours from said at least one selected intermediate tuple of corresponding colours such that said final tuples have colors with a difference to said estimated cross-channel colour mapping model that are smaller than a determined threshold; and
- compensating colour difference between said images based on said final set of final tuples of corresponding colours.

2. The method for compensation of colour differences according to claim 1, wherein said extracting is based on matching feature points between said images.

3. The method for compensation of colour differences according to claim 1, wherein estimating the channel-wise colour mapping model for each of said m colour channels is performed such as to model, in said colour channel, colour differences between colours of each tuple.

4. The method for compensation of colour differences according to claim 1, wherein said at least one cross-channel colour mapping model is based on thin plate splines.

5. An arrangement for compensation of colour differences between at least two images imaging a same scene, the colours of which are represented according to m colour channels, comprising:
- a processor coupled to a memory, the processor being configured to:
  - extract from said images a set of tuples of corresponding colours;
  - estimate from said set of tuples of corresponding colours a channel-wise colour mapping model for each of said m colour channels;
  - select within said set of tuples of corresponding colours at least one intermediate tuple having colours with a difference to said estimated channel-wise colour mapping model that are smaller than a determined threshold;
  - estimate from said at least one selected intermediate tuple of corresponding colours at least one cross-channel coulour mapping model for at least one of said m colour channels;
  - generate a final set of final tuples of corresponding colours from said at least one selected intermediate tuple of corresponding colours such that said final tuples have colors with a difference to said estimated cross-channel colour mapping model that are smaller than a determined threshold; and
  - compensate colour difference between said images based on said final set of final tuples of corresponding colours.

6. The arrangement for compensation of colour differences according to claim 5, wherein said extracting is based on matching feature points between said images.

7. The arrangement for compensation of colour differences according to claim 5, wherein estimating the channel-wise colour mapping model for each of said m colour channels is performed such as to model, in said colour channel, colour differences between colours of each tuple.

8. The arrangement for compensation of colour differences according to claim 5, wherein said at least one cross-channel colour mapping model is based on thin plate splines.

* * * * *